(12) United States Patent
Tikuisis et al.

(10) Patent No.: US 7,361,703 B2
(45) Date of Patent: Apr. 22, 2008

(54) PHENOL FREE STABILIZATION OF POLYETHYLENE FILM

(75) Inventors: Tony Tikuisis, Calgary (CA); Norman Dorien Joseph Aubee, Okotoks (CA); Denny Paul Sauvageau, Calgary (CA); Laura Elaine Ellis, Calgary (CA); Ian Robert Gibbons, Calgary (CA); P. Scott Chisholm, Calgary (CA)

(73) Assignee: Nova Chemical (International) S.A. (CH)

( * ) Notice: Subject to any disclaimer, the term of this patent is extended or adjusted under 35 U.S.C. 154(b) by 437 days.

(21) Appl. No.: 11/091,182

(22) Filed: Mar. 28, 2005

(65) Prior Publication Data
US 2005/0261403 A1   Nov. 24, 2005

(30) Foreign Application Priority Data
May 18, 2004   (CA) .................................. 2464551

(51) Int. Cl.
*C08K 5/526* (2006.01)
(52) U.S. Cl. ...................... 524/128; 524/130; 524/151; 524/152; 524/153
(58) Field of Classification Search ................ 524/128, 524/130, 151–153
See application file for complete search history.

(56) References Cited

U.S. PATENT DOCUMENTS

| 4,611,016 A |   | 9/1986 | Hinsken et al. ................ 529/99 |
| 5,219,600 A | * | 6/1993 | Kosegaki et al. ........... 426/106 |
| 5,596,033 A |   | 1/1997 | Horsey et al. .............. 524/100 |
| 5,844,029 A |   | 12/1998 | Prabhu et al. .............. 524/236 |
| 5,883,165 A |   | 3/1999 | Krohnke et al. ............ 524/111 |
| 6,077,890 A |   | 6/2000 | Hudson et al. ............. 524/100 |
| 6,664,317 B2 |   | 12/2003 | King, III ..................... 524/99 |

FOREIGN PATENT DOCUMENTS

| JP | 05-179076 | * | 7/1993 |
| JP | 05-247287 | * | 9/1993 |
| JP | 06-313076 | * | 11/1994 |

OTHER PUBLICATIONS

Urs Stadler, Impact of Stabilization Additives on the Controlled Degradation of Polypropylene, Polyolefins 2001, Houston, TX, 2001, pp. 521-542.

* cited by examiner

*Primary Examiner*—Peter Szekely
(74) *Attorney, Agent, or Firm*—Kenneth H. Johnson

(57) ABSTRACT

This invention provides a process for the stabilization of thermoplastic polyolefins during melt processing operations. The stabilizer package of this invention is "phenol free" and must contain at least one aryl monophosphite and at least one diphosphite. The process of this invention is especially suitable for the manufacture of polyethylene film.

4 Claims, No Drawings

PHENOL FREE STABILIZATION OF POLYETHYLENE FILM

FIELD OF THE INVENTION

This invention relates to the melt processing of polyolefins using a stabilizer which is essentially free of any phenolic antioxidant.

BACKGROUND OF THE INVENTION

Polyolefins are conventionally stabilized with a phenolic antioxidant and a phosphite. A hindered amine light stabilizer (or "HALS") may also be included if long term stabilization is desired. These formulations generally provide adequate stabilization performance during the melt processing operations which are used to produce finished plastic parts from the thermoplastic polyolefin resin and during the normal lifetime of the parts.

A general overview of phenol/phosphite stabilizer systems is provided in Polyolefins 2001—The International Conference on Polyolefins, "Impact of Stabilization Additives on the Controlled Degradation of Polypropylene", p. 521, presented by Urs Stadler of Ciba Specialty Chemicals Corporation. For convenience, a summary of the teachings of this paper is provided below. It is generally accepted that:
1. Carbon centered radicals (or "CCRs") are formed when polyolefins are subjected to heat and sheer during melt processing;
2. CCRs react with oxygen to form peroxy radicals (or "PRs"); and
3. PR's react with the polyolefin to form hydroperoxides (or "HPs") and more CCRs.

In a conventional phenol/phosphite stabilizer system, it is generally accepted that:
1. the phenolic (which is also referred to as the "primary" antioxidant) decomposes the carbon centered radicals and peroxy radicals; and
2. the phosphite (which is also referred to as the "secondary" antioxidant) decomposes the hydroperoxides.

In addition, it is generally accepted that (a) the phenolic antioxidant provides a synergistic effect at the temperatures which are encountered during melt processing by reducing the rate at which the phosphite is depleted or consumed; and (b) if/when the phosphite is depleted (to below the concentration which is required for the decomposition of the hydroperoxides) then the structure of the polyolefin is altered by the action of the free radicals. In polypropylene, this generally results in "chain scission" (a reduction in the molecular weight of the polypropylene) whereas "crosslinking" is generally believed to predominate in polyethylene (which results in an increase in apparent molecular weight).

Stabilizer packages which comprise a combination of a phenolic antioxidant and a phosphite are in wide spread commercial use and generally provide efficient and cost effective results.

However, the use of phenolics is associated with color development in the finished plastic parts, especially in polyethylene or polypropylene which is produced with a transition metal catalyst (such as titanium, vanadium, zirconium or chromium). For example, "yellowing" and "pinking" have been observed in plastic parts which are stabilized with a phenolic antioxidant.

Thus, as noted in United States patent ("USP") U.S. Pat. No. 5,596,033: "there is a long-felt need in the market place for a stabilizer system which can prevent color formation associated with the use of phenolic antioxidants".

Several "phenol free" stabilization systems have been proposed and brief overviews of several of these systems follow:

1. Phosphites plus hindered amines (HALS): these phenol free systems are reported to lack adequate process stabilization (see U.S. Pat. No. 5,596,033).
2. N,N-dialkylhydroxylamine plus HALS: these phenol free systems are expensive (due to the high cost of the hydroxylamine) and may have restricted use in certain food contact applications due to FDA regulations (again, due to the presence of the hydroxylamine) (U.S. Pat. No. 5,596,033).
3. HALS, plus hydroxylamine (or nitrone) plus phosphite: as above, these phenol free systems are expensive and may have restrictions upon their use (U.S. Pat. No. 6,664,317).
4. HALS plus hydroxylamine plus a mixture of two hydrolytically resistant phosphites: as above, these phenol free systems are expensive and may have restrictions upon their use (U.S. Pat. No. 6,077,890).
5. Lactones (such as benzofuranone) plus HALS: these phenol free systems are also expensive (due to the high cost of the lactone) and may have restricted use due to FDA regulations concerning the use of lactones (U.S. Pat. No. 5,883,165).

We have now discovered an effective low cost, phenol free stabilization package for the melt processing of polyolefins.

SUMMARY OF THE INVENTION

The present invention provides a process for stabilizing a thermoplastic polyolefin during melt processing conditions, said process comprising the step of incorporating into said thermoplastic polyolefin a stabilizer package comprising:
 (i) at least one aryl monophosphite; and
 (ii) at least one diphosphite, and subjecting said thermoplastic polyolefin to sufficient temperature to melt said polyolefin;

with the proviso that said stabilizer package is essentially free of any additive selected from the group consisting of hindered phenolic antioxidants, lactone stabilizers and hydroxylamine stabilizers.

DETAILED DESCRIPTION

This invention generally relates to the melt processing of polyolefins using a stabilizer system which is essentially free of phenolic antioxidant.

The "phenol free" melt processing operation of this invention is generally suitable for any thermoplastic polyolefin, though thermoplastic polypropylene and polyethylene are preferred. The preferred thermoplastic polyolefins for use in this invention are prepared with a transition metal catalyst such as titanium, vanadium, zirconium or chromium and the present invention is particularly suitable for polyolefins which contain from about 0.5 parts per million by weight ("ppm") to about 10 parts per million by weight of transition metal residue. (The process of this invention may not provide complete process stabilization if the polyolefin contains more than 10 parts per million transition metal and the process of this invention may not be required if the polyolefin contains less than 0.5 ppm of transition metal). In addition, the polyolefin may contain magnesium residues (in amounts up to 500 ppm); aluminum residues (in amounts up to 150 ppm); and chlorine residues (in amounts up to 200 ppm).

It is preferred that the thermoplastic polyolefin is a linear polyethylene having:
 (i) a density of from 0.880 grams per cubic centimeter (g/cc) to 0.960 grams per cubic centimeter (g/cc)—especially from 0.910 to 0.945 g/cc; and (ii) a melt index, $I_2$, as determined by ASTM D 1238 of from 0.3 (grams per 10 minutes) to 150, especially from 1 to 100 and most preferably from 1.5 to 5.

The most preferred linear polyethylene are copolymers of ethylene with at least one other olefin selected from the group consisting of butene, pentene, hexene, and octene. These thermoplastic polyethylenes may be produced in any of the known polymerization processes (such as a gas phase process, a slurry process or a solution process) using any known polymerization catalyst (such as a chromium catalyst, a Ziegler Natta catalyst or a single site catalyst such as a metallocene catalyst or a so-called "constrained geometry catalyst".

The melt processing process of this invention is characterized by:

(1) the required use of a defined aryl monophosphite (described in part A below);

(2) the required use of a defined diphosphite or diphosphonite (described in part B below); and (3) that the melt processing is essentially free of a phenolic antioxidant or hydroxylamine or lactone stabilizer (described in part D below).

In addition to the two require phosphites, the stabilizer package used in the present invention preferably contains an acid neutralizer (described in Part C.1 below). If the finished part which is made in accordance with the present invention is intended for long term use, then the use of additional stabilizers (especially HALS) is preferred as described in C.2 below. Other conventional additives may also be included.

Part A "Aryl Monophosphite"

As used herein, the term aryl monophosphite refers to a phosphite stabilizer which contains:

(1) only one phosphorus atom per molecule; and (2) at least one aryloxide (which may also be referred to as phenoxide) radical which is bonded to the phosphorus.

Preferred aryl monophosphites contain three aryloxide radicals—for example, tris phenyl phosphite is the simplest member of this preferred group of aryl monophosphites.

Highly preferred aryl monophosphites contain $C_1$ to $C_{10}$ alkyl substituents on at least one of the aryloxide groups. These substituents may be linear (as in the case of nonyl substituents) or branched (such as isopropyl or tertiary butyl substituents).

Non-limiting examples of suitable aryl monophosphites follow. Preferred aryl monophosphites are indicated by the use of trademarks in square brackets.

Triphenyl phosphite; diphenyl alkyl phosphites; phenyl dialkyl phosphites; tris(nonylphenyl) phosphite [WESTON 399, available from GE Specialty Chemicals]; tris(2,4-di-tert-butylphenyl) phosphite [IRGAFOS 168, available from Ciba Specialty Chemicals Corp.]; and bis(2,4-di-tert-butyl-6-methylphenyl) ethyl phosphite [IRGAFOS 38, available from Ciba Specialty Chemicals Corp.]; and 2,2',2''-nitrilo [triethyltris(3,3'5,5'-tetra-tert-butyl-1,1'-biphenyl-2,2'-diyl) phosphite [IRGAFOS 12, available from Ciba Specialty Chemicals Corp.].

As illustrated by data in the accompanying examples, the tertiary butyl substituted aryl phosphites are preferred.

The amount of aryl monophosphite used in the present invention is from 200 to 2,000 ppm (based on the weight of the polyolefin), preferably from 300 to 1,500 ppm and most preferably from 400 to 1,000 ppm.

The aryl monophosphite is critical to the present invention. Whilst not wishing to be bond by theory, it is postulated that (i) the aryl monophosphite decomposes during the melt processing operation of this invention and provides a phenolic structure (in-situ); and (ii) the "in-situ phenolic" provides a synergistic effect with respect to reducing the rate of decomposition of the remaining active phosphite (without leading to the excessive color formation which is typically observed in a conventional phenol/phosphite stabilizers system).

Part B. Phosphite or Diphosphite

As used herein, the term diphosphite refers to a phosphite stabilizer which contains at least two phosphorus atoms per phosphite molecule (and, similarly, the term diphosphonite refers to a phosphonite stabilizer which contains at least two phosphorus atoms per phosphonite molecule).

Non-limiting examples of suitable diphosphites and diphosphonites follow: distearyl pentaerythritol diphosphite, diisodecyl pentaerythritol diphosphite, bis(2,4 di-tert-butylphenyl) pentaerythritol diphosphite [ULTRANOX 626, available from GE Specialty Chemicals]; bis(2,6-di-tert-butyl-4-methylpenyl) pentaerythritol diphosphite; bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tetrakis(2,4-di-tert-butylphenyl)4,4'-bipheylene-diphosphonite [IRGAFOS P-EPQ, available from Ciba] and bis(2,4-dicumylphenyl) pentaerythritol diphosphite [DOVERPHOS S9228-T or DOVERPHOS S9228-CT].

PEPQ (CAS No 119345-01-06) is an example of a commercially available diphosphonite.

The diphosphite and/or diphosphonite are used in amounts of from 200 ppm to 2,000 ppm, preferably from 300 to 1,500 ppm and most preferably fro 400 to 1,000 ppm.

The use of diphosphites is preferred over the use of diphosphonites. The most preferred diphosphites are those available under the trademarks DOVERPHOS S9228-CT and ULTRANOX 626.

Whilst not wishing to be bound by theory, it is generally accepted that these most preferred diphosphites have different kinetic activities during melt processing operations in comparison to the aryl monophosphites described in Part A. As will be shown in the examples, we have observed that these preferred diphosphites may be consumed at a faster rate (than the aryl monophosphites) when employed in the process of this invention.

Part C.1 Acid Neutralizers

Many commercially available polyolefins contain chloride residues. These chloride residues may generate hydrochloric acid, particularly during melt processing operations. Accordingly, an "acid neutralizer" is conventionally included in a polyolefin stabilization package and is preferably included in the process of this invention.

These acid neutralizers may be divided into "Inorganic"—such as zinc oxide, synthetic hydrotalcites and Li, Na, Ca or Al (hydroxy) carbonates; and "Organic"—such as salts of fatty acids or their derivatives including calcium stearate, zinc stearate, calcium lactate and calcium stearoyl lactylate.

When employed, these conventional acid neutralizers are used in conventional amounts. It is preferred to use a synthetic hydrotalcite (in an amount of from 100 to 1,000 ppm), zinc stearate (in an amount of from 200 to 700 ppm) or calcium stearoyl lactylate (in an amount of from 200 to 700 ppm). A combination of a hydrotalcite with an "organic" acid neutralizer is highly preferred.

Part C.2 Long Term Stabilizers

Plastic parts which are intended for long term use preferably contain at least one HALS (C.2.1).

Part C.2.1 HALS

A hindered amine light stabilizer (HALS) is preferably included in the stabilizer package used in the present invention if the plastic part is intended for more than single/short term use.

HALS are well known to those skilled in the art.

When employed, the HALS is preferably a commercially available material and is used in a conventional manner and amount.

Commercially available HALS include those sold under the trademarks CHIMASSORB 119; CHIMASSORB 944; CHIMASSORB 2020; TINUVIN 622 and TINUVIN 770 from Ciba Specialty Chemicals Corporation, and CYASORB UV 3346, CYASORB UV 3529, CYASORB UV 4801, and CYASORB UV 4802 from Cytec Industries. TINUVIN 622 is preferred. Mixtures of more than one HALS are also contemplated.

Suitable HALS include: bis (2,2,6,6-tetramethylpiperidyl)-sebacate; bis-5 (1,2,2,6,6-pentamethylpiperidyl)-sebacate; n-butyl-3,5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone).

Part C.2.2 Other Optional Additives

C.2.2.1 2-(2'-hydroxyphenyl)-benzotriazoles

For example, the 5'-methyl-,3'5'-di-tert-butyl-,5'-tert-butyl-,5'(1,1,3,3-tetramethylbutyl)-,5-chloro-3',5'-di-tert-butyl-,5-chloro-3'-tert-butyl-5'-methyl-3'-sec-butyl-5'-tert-butyl-,4'-octoxy,3',5'-ditert-amyl-3',5'-bis-(alpha, alpha-dimethylbenzyl)-derivatives.

C.2.2.2 2-Hydroxy-Benzophenones

For example, the 4-hydroxy-4-methoxy-,4-octoxy,4-decyloxy-,4-dodecyloxy-,4-benzyloxy,4,2',4'-trihydroxy-and 2'-hydroxy-4,4'-dimethoxy derivative.

C.2.2.3 Esters of Substituted and Unsubstituted Benzoic Acids

For example, phenyl salicylate; 4-tertbutylphenyl-salicilate; octylphenyl salicylate; dibenzoylresorcinol; bis-(4-tert-butylbenzoyl)-resorcinol; benzoylresorcinol; 2,4-di-tert-butyl-phenyl-3,5-di-tert-butyl-4-hydroxybenzoate; and hexadecyl-3,5-di-tert-butyl-4-hydroxybenzoate.

C.2.2.4 Acrylates

For example, alpha-cyano-.beta,.beta.-diphenylacrylic acid-ethyl ester or isooctyl ester; alpha-carbomethoxy-cinnarnic acid methyl ester; alpha-cyano-.beta.-methyl-p-methoxy-cinnamic acid methyl ester or butyl ester; alpha-carbomethoxy-p-methoxy-cinnamic acid methyl ester; and N-(beta-carbomethoxy-beta-cyano-vinyl)-2-methyl-indoline.

C.2.2.5 Nickel Compounds

For example, nickel complexes of 2,2'-thio-bis(4-(1,1,1,3-tetramethylbutyl)-phenol), such as the 1:1 or 1:2 complex, optionally with additional ligands such as n-butylamine, triethanolamine or N-cyclohexyl-diethanolamine; nickel dibutyldithiocarbamate; nickel salts of 4-hydroxy-3,5-di-tert-butylbenzylphosphonic acid monoalkyl esters, such as of the methyl, ethyl, or butyl ester; nickel complexes of ketoximes such as of 2-hydroxy-4-methyl-penyl undecyl ketoxime; and nickel complexes of 1-phenyl-4-lauroyl-5-hydroxy-pyrazole, optionally with additional ligands.

C.2.2.6 Oxalic Acid Diamides

For example, 4,4'-di-octyloxy-oxanilide; 2,2'-di-octyloxy-5',5'-ditert-butyloxanilide; 2,2'-di-dodecyloxy-5',5'di-tert-butyl-oxanilide; 2-ethoxy-2'-ethyl-oxanilide; N,N'-bis(3-dimethylaminopropyl)-oxalamide; 2-ethoxy-5-tert-butyl-2'-ethyloxanilide and its mixture with 2-ethoxy-2'-ethyl-5,4-di-tert-butyloxanilide; and mixtures of ortho-and paramethoxy as well as of o- and p-ethoxy-disubstituted oxanilides.

C.2.2.7 Hydroxyphenyl-s-triazines

For example, 2,6-bis-(2,4-dimethylphenyl)-4-(2-hydroxy-4octyloxyphenyl)-s-triazine; 2,6-bis(2,4-dimethylphenyl)-4-(2,4-dihydroxyphenyl)-s-triazine; 5 2,4-bis(2,4-dihydroxyphenyl)-6-(4-chlorophenyl)-s-triazine; 2,4-bis(2-hydroxy-4-(2-hydroxyethoxy)phenyl)-6-(4-chlorophenyl)-s-triazine; 2,4-bis(2hydroxy-4-(2-hydroxyethoxy)phenyl)-6-phenyl-s-triazine; 2,4-bis(2-hydroxy-4-(2-hydroxyethoxy)-phenyl)-6-(2,4-dimethylphenyl)-s-triazine; 2,4-bis(2-hydroxy-4-(2-hydroxyethoxy)phenyl)-6-(4-bromo-phenyl)-s-triazine; 2,4-bis(2-hydroxy-4-(2-acetoryethoxy)phenyl)-6-(4-chlorophenyl)-s-triazine; and 2,4-bis(2,4-dihydroxyphenyl)-6-(2,4-dimethylphenyl)-1-s-triazine.

C.2.2.8 Metal Deactivators

For example, N,N'diphenyloxalic acid diamide; N-salicylal-N'-salicyloylhydrazine; N,N'-bis-salicyloylhydrazine; N,N'-bis-(3,5-di-tert-butyl-4-hydrophenylpropionyl)-2-hydrazine; salicyloylarnino-1,2,4-triazole; and bis-benzylidenoxalic acid dihydrazide.

C.2.2.9 Peroxide Scavengers

For example, esters of betathiodipropionic acid, for example the lauryl, stearyl, myristyl or tridecyl esters; mercaptobenzimidazole or the zinc salt of 2-mercaptobenzimidazole; zinc-dibutyldithiocarbamate; dioctadecyldisulfide; and pentaerythritottetrakis-(beta-dodecylmercapto)-propionate.

C.2.2.10 Polyamide Stabilizers

For example, copper salts in combination with iodides and/or phosphorus compounds and salts of divalent manganese.

C.2.2.11. Nucleating Agents

For example, 4-tert-butylbenzoic acid; adipic acid; diphenylacetic acid; sodium salt of methylene bis-2,4-dibutylphenyl; cyclic phosphate esters; sorbitol tris-benzaldehyde acetal; and sodium salt of bis(2,4-di-t-butylphenyl) phosphate or Na salt of ethylidene bis(2,4-di-t-butyl phenyl) phosphate.

C.2.2.12. Fillers and Reinforcing Agents

For example, calcium carbonate; silicates; glass fibers; asbestos; talc; kaolin; mica; barium sulfate; metal oxides and hydroxides; carbon black and graphite.

C.2.2.13. Miscellaneous Additives

For example, plasticizers; epoxidized vegetable oils, such as epoxidized soybean oils; lubricants; emulsifiers; polymer process additives (e.g. fluoroelastomers); pigments; optical brighteners; flameproofing agents; anti-static agents; blowing agents and thiosynergists, such as dilaurythiodipropionate or distearylthiodipropionate.

The term "phenol free" has been used herein to refer to a stabilizer package which is "essentially free" of any "primary" antioxidant such as a phenolic, lactone or hydroxylamine. The phrase "essentially free" is meant to convey a plain meaning, namely that none of the phenolic (or lactone or hydroxylamine) is deliberately added to the polyolefin in order to achieve the melt stabilization of this invention. The "excluded" stabilizers (i.e. the stabilizers which are not deliberately added to the polyolefin according to this invention) are described in Part D below.

Part D. Excluded Stabilizers

The process of this invention utilizes a stabilizer package which is essentially free of phenolic antioxidants, hydroxyl amines (and amine oxides) and lactones.

Part D.1 Phenolic Antioxidants

D.1.1 Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6,-tricyclohexyphenol; and 2,6-di-tert-butyl-4-methoxymethylphenol.

D.1.2 Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

D.1.3 Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

D. 1.4 Alkylidene-Bisphenols

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy-2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methylbenzyl)-6-tert-butyl-4-methylphenyl) terephthalate; and other phenolics such as monoacrylate esters of bisphenols such as ethylidiene bis-2,4-di-t-butylphenol monoacrylate ester.

D.1.5 Benzyl Compounds

For example, 1,3,5-tris-(3,5-di-tert-butyl-4-hydroxybenzyl)-2,4,6-trimethylbenzene; bis-(3,5-di-tert-butyl-4-hydroxybenzyl)sulfide; isooctyl 3,5-di-tert-butyl-4-hydroxybenzyl-mercaptoacetate; bis-(4-tert-butyl-3hydroxy-2,6-dimethylbenzyl)dithiol-terephthalate; 1,3,5-tris-(3,5-di-tert-butyl-4,10 hydroxybenzyl)isocyanurate; 1,3,5-tris-(4-tert-butyl-3-hydroxy-2,6-dimethylbenzyl)isocyanurate; dioctadecyl 3,5-di-tert-butyl-4-hydroxybenzylphosphonate; calcium salt of monoethyl 3,5-di-tertbutyl-4-hydroxybenzylphosphonate; and 1,3,5-tris-(3,5-dicyclohexyl-4-hydroxybenzyl)isocyanurate.

D.1.6 Acylaminophenols

For example, 4-hydroxy-lauric acid anilide; 4-hydroxy-stearic acid anilide; 2,4-bis-octylmercapto-6-(3,5-tert-butyl-4-hydroxyanilino)-s-triazine; and octyl-N-(3,5-di-tert-butyl-4-hydroxyphenyl)-carbamate.

D.1.7 Esters of beta-(5-tert-butyl-4-hydroxy-3-methylphenyl)-propionic acid with Monohydric or Polyhydric Alcohols For example, methanol; diethyleneglycol; octadecanol; triethyleneglycol; 1,6-hexanediol; pentaerythritol; neopentylglycol; tris-hydroxyethyl isocyanurate; thidiethyleneglycol; and dihydroxyethyl oxalic acid diamide.

D.1.8 Amides of beta-(3,5-di-tert-butyl-4hydroxyphenol)-propionic acid

For example, N,N'-di-(3,5-di-tert-butyl-4-hydroxyphenylpropionyl)-hexamethylendiamine; N,N'-di-(3,5-di-tert-butyl-4-hydroxyphenylpropionyl)trimethylenediamine; and N,N'-di(3,5-di-tert-butyl-4-hydroxyphenylpropionyl)-hydrazine.

Part D.2 Hydroxylamines and Amine Oxides

The process of this invention is essentially free of hydroxylamine stabilizers. For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamnine; N-heptadecyl-N-octadecylhydroxylamine; and N,N-dialkylhydroxylamine derived from hydrogenated tallow amine. The analogous amine oxides (as disclosed in U.S. Pat. No. 5,844,029, Prachu et al.) are also meant to be included by the definition of hydroxylamine (and thus are not used in the process of this invention).

Part D.3 Lactones

The process of this invention is essentially free of lactone stabilizers.

The use of lactones such as benzofuranone (and derivatives thereof) or indolinone (and derivatives thereof) as stabilizers is described in U.S. Pat. No. 4,611,016.

Melting Processing Operations

In general, the process of this invention is suitable for processing molten thermoplastic polyolefins. The melt processing operations are conducted at temperatures from above the melting point of the thermoplastic polyolefin to as high as 400° C.

The present process is particularly suitable for extrusion operations, injection molding operations and rotomolding operations.

The extrusion of polyethylene film is particularly preferred. Examples of polyethylene film extrusion process include the blown film process and cast film process which are briefly described below.

In a blown film process, the polyethylene is melted in a screw extruder (preferably at a temperature of from 200 to 290° C., especially from 210 to 250° C.) and then forced through an annuler die to form a tube of molten polyethylene. The tube is inflated with air from the interior of the tube, then cooled and finally flattened by nip rolls. It is also known to co-extrude multi layers of film by this process.

In a cast film process, the polyethylene is also melted in a screw extruder (preferably at temperatures of from 450° F. (232° C.) to 600° F. (316° C.) especially from 500° F. (260° C.) to 550° F. (288° C.) and then forced through a flat die. The molten polyethylene web is then cooled (typically, through the use of a water bath or, alternatively, temperature controlled casting rolls).

In an injection molding process, the polyethylene is typically melted in a screw extruder and then rammed under very high pressures into a hollow mold.

In a rotomolding process, the polyethylene resin is ground into a fine powder, then charged into a hollow mold. The mold is then placed in a furnace and heated to temperatures of from 250° C. to 325° C. (especially from 520° F. (271° C.) to 600° F. (316° C.)) while the mold is rotated. The molten plastic flows through the mold under the gentle (low shear) forces from the rotation.

The cast film process is especially challenging for stabilization systems because it combines high temperatures and high shear rates.

In a preferred embodiment which is illustrated in the examples, the process of this invention relates to the preparation of polyethylene film in a cast film process.

EXAMPLE 1

A series of small scale experiments was completed to investigate the performance of various stabilizers. The experiments were undertaken in a fusion-head mixer (manufactured by C.W. Brabender Instruments, Inc.) equipped with roller mixing blades in a mixing bowl having a 40 cc capacity. The stabilizer formulations (shown in Table 1) were mixed with a thermoplastic polyethylene in the fusion-head mixer for a period of 10 minutes at 160° C.

The thermoplastic polyethylene used in all experiments of example 1 was an ethylene-hexane copolymer having a density of about 0.921 g/cc and a melt index, $I_2$ (as determined by ASTM D 1238) of about 0.8 grams per 10 minutes. This copolymer was produced in a gas phase polymerization process using a magnesium-titanium type catalyst with an alkyl aluminum cocatalyst. Residual titanium levels in this polyethylene are typically between 2 and 3 ppm.

The resin was removed from the Brabender mixer after the ten minute test and pressed into plaques. Color measurements were performed on the plaques in accordance with ASTM standards (yellow index or "YI" was determined according to ASTM D 1925 and whiteness index or "WI" was determined according to ASTM E313).

Low YI values and high WI values are desirable. Color data are also provided in Table 1.

Two control experiments (C1 and C2) were conducted using a conventional stabilizer package (C1 contained 300 ppm of a phenolic and 300 ppm of a phosphite sold under the trademarks IRGANOX 1076 and IRGAFOS 168, respectively, by Ciba Specialty Chemicals); while C2 contained 300 ppm of the IRGANOX 1076 phenolic and 300 ppm of tris (nonylphenyl) phosphite). The color data shown in Table 1 clearly indicate that these stabilizer packages generate undesirable color under the conditions of this experiment. The YI and WI of the resin of experiment C1 were 22.6 and −7.3, respectively, while the color levels produced in C2 were only marginally better.

Comparative experiments C3 and C4 were completed using 300 ppm of a single phosphite stabilizer. The results from these experiments show that the elimination of the phenolic provides a desirable reduction in the YI of the resins. C3 was completed with an aryl monophosphite while C4 was completed with a diphosphite. It has been proposed to use a HALS and a single phosphite (for the stabilization of polypropylene fibers) in view of the desirable color results—but this stabilizer "package" is reported to provide inadequate melt flow stability (see U.S. Pat. No. 5,596,033).

Inventive experiment 1 was completed using 150 ppm of the phosphite used in control experiment C3 and 150 ppm of the phosphite used in control experiment C4. The results from this experiment show color values which are better than those obtained in either experiment C1 or C2. This suggests a possible synergistic interaction between the aryl monophosphite and the diphosphite stabilizers.

The outstanding color performance of inventive experiment 2 was obtained by the further addition of an organic acid neutralizer (namely 500 ppm of calcium stearoyl lactylate) to the stabilizer package of experiment 1.

Inventive experiments 3 and 4 indicate the use of hydrotalcite (an inorganic acid neutralizer) may add color to the resins.

Inventive experiment 5 shows that a HALS may be included in the stabilizer package of this invention (if long term stabilization is desired) without causing any large increases in color generation. Experiment 5 was completed with an alternative aryl monophosphite (namely tris (nonylphenyl) phosphite). The results from this experiment indicate that branched substituents on the phenyl groups are preferred (i.e. t-butyl is preferred to nonyl).

Experiment 6 was completed with a diphosphonite instead of a diphosphite.

The data from all the experiments of this example only show that the inventive stabilizer systems provide good color performance in comparison to conventional phenolic/phosphite stabilizers. That is, the data do not provide any insight with respect to melt flow stabilization. Example 2 illustrates that the present invention further provides excellent "melt flow stability".

TABLE 1

| Experiment | YI | WI | AOI | P1 | P2 | P3 | P4 | HI | AN1 | AN2 | AN3 |
|---|---|---|---|---|---|---|---|---|---|---|---|
| C1 | 22.6 | −7.3 | 300 | 300 | | | | | | | |
| C2 | 20.3 | −12.8 | 300 | | | 300 | | | | | |
| C3 | 1.8 | 50.2 | | 300 | | | | | | | |
| C4 | 3.4 | 44.4 | | | 300 | | | | | | |
| 1 | 1.6 | 51.2 | | 150 | 150 | | | | | | |
| 2 | 0.1 | 55.7 | | 150 | 150 | | | | 500 | | |
| 3 | 2.5 | 45.6 | | 150 | 150 | | | | | 500 | 500 |
| 4 | 4.3 | 43.5 | | 150 | 150 | | | | | 500 | |

TABLE 1-continued

| Experiment | YI | WI | AOI | P1 | P2 | P3 | P4 | H1 | AN1 | AN2 | AN3 |
|---|---|---|---|---|---|---|---|---|---|---|---|
| 5 | 1.2 | 51.8 | | 150 | 150 | | | 500 | | | |
| 6 | 4.2 | 42.5 | | | 150 | 150 | | | | | |
| 7 | 2.7 | 46.6 | | 150 | | | 150 | | | | |

AO1 = IRGANOX 1076
P1 = IRGAFOS 168
P2 = DOVERPHOS S9228-CT
P3 = TNPP
P4 = P-EPQ
H1 = TINUVIN 622
AN1 = Calcium stearoyl lactylate
AN2 = Hydrotalcite (DHT-4A)
AN3 = Zinc stearate

EXAMPLE 2

The desirable "color" performance illustrated in Example 1 is of little practical value unless the stabilizer package also provides "melt flow stability". As previously noted, a useful stabilizer package must protect against chain scission reactions in polypropylene (leading to an increase in melt index) and crosslinking reactions in polyethylene. The problems caused by crosslinking of polyethylene are manifested in changes in the physical properties of the finished polyethylene good. For example, a crosslinking reaction in polyethylene used to prepare film may cause a loss of elongation, impact strength and machine direction (MD) tear strength.

Accordingly, the "mixed phosphite" stabilizer of the present invention was tested in a cast film process for the manufacture of polyethylene film. The thermoplastic polyethylene used in the experiments of this example was an ethylene-octene copolymer having a melt index, $I_2$, of about 2.4 and a density of about 0.920 g/cc. This polyethylene was produced in a solution polymerization process and typically contains from 7 to 10 ppm residual titanium.

The cast film process generally consists of extruding molten polymer through a flat die into either a water bath or onto casting rolls which are temperature controlled. The molten web is drawn down to the desired gauge. The polymer melt is quenched quickly and thus process results in a film with high gloss and clarity and reduced crystallinity. The film web can be treated or modified and then wound into rolls.

The experiments of this example were performed on a Gloucester 3 layer co-extrusion cast film line. The line consists of one 3.5 inch (about 8.75 cm) air cooled extruder with a L/D ratio (length/diameter) of 30:1 and one 2.5 inch (about 6.25 cm) air cooled extruder with an L/D of 24:1. Typical melt temperatures utilized in the cast film process range from 220 to 320° C., especially 450° F. (232° C.) to 600° F. (316° C.). For the purpose of this evaluation the temperature profile was set to obtain a melt temperature between 515° F. (268° C.) and 525° F. (274° C.). The polymer melt streams are combined using a coextrusion feedblock and can produced either A/B/A or A/B type structures, for the purpose of this evaluation an A/B/A feedblock arrangement was utilized and layer ratios of 10%/80%/10% targeted. The same material was utilized in all layers to ensure any differences in performance could be attributed to the material in question. The feedblock is mounted to a 30 inch (about 75 cm) flexible lip die, manufactured by Extrusion Dies Incorporated, and the die gap adjusted to 0.025 inch (about 0.063 cm). The molten web is extruded onto cast rolls utilizing an air gap of 1.25 inches (about 3 cm). The web is pinned to the casting roll utilizing a vacuum box. The casting roll temperature was set at 90° F. (about 32° C.) and the cooling roll set at 80° F. (about 27° C.). A target line speed of 800 ft/minute (about 240 m/minute) was utilized and the extrusion rate adjusted to obtain a target film gauge of 0.8 mil. The extrusion rate during this evaluation ranged between 430-460 lbs/hr (about 195-209 kg/hr). The film was trimmed to a width of 18.25 inches (about 46 cm) and wound onto a roll.

Physical properties of the finished films were evaluated according to the following ASTM standards:
Dart Impact: D 1709
Machine Direction (MD) Tear Strength: D 1922

In addition, the films were evaluated using an industry-standard instrument manufactured by Highlight Industries. The tests done on the Highlight machine were completed according to the procedures recommended by the manufacturer. This instrument was used to determine the "elongation" of the film (i.e. percent elongation at break), which is a key property for "stretch film" that is manufactured by the cast process.

Four different stabilizer formulations were tested as shown in Table 2.1. Three sets of data are shown in Table 2.1. The first set indicates "aiming points" for each of the stabilizer components; for example, the aiming points for inventive experiment 40 were 0 ppm of AO1, 750 ppm of P1 and 500 ppm of P2.

The second set shows measured values of the stabilizer components. The measurements were made on resin (prior to the resin being converted into film) using a High Performance Liquid Chromatography (HPLC) technique. As shown in Table 2.1, the resin used in experiment 40 was determined to contain 718 ppm of P1 and 447 ppm of P2.

The third data set shows measured values of residual, active stabilizer in the film. Thus, the film from inventive experiment 40 was determined to contain 503 ppm of "active" P1 and 176 ppm of "active" P2.

Table 2.2 shows selected physical properties of the films produced in this example. The data illustrate that the film of inventive experiment 40 has a desirable balance of properties. In particular, the data illustrate that the film retained good MD tear strength and elongation (which is significant because, as previously noted, a loss of MD tear strength and elongation may be observed if the stabilizer does not function well).

TABLE 2.1

| Experiment | AO1 | P1 | P2 | P1$^r$ | P2$^r$ |
|---|---|---|---|---|---|
| 10-c Aim | 750 | 500 | 500 | | |
| Measured | 732 | 525 | 381 | 458 | 235 |
| 20-c Aim | 1000 | 1000 | 0 | | |
| Measured | 1037 | 957 | 0 | 780 | 0 |

TABLE 2.1-continued

| Experiment | A01 | P1 | P2 | P1r | P2r |
|---|---|---|---|---|---|
| 30-c Aim | 750 | 500 | 500 | | |
| Measured | 682 | 495 | 444 | 422 | 256 |
| 40 Aim | 0 | 750 | 500 | | |
| Measured | 0 | 718 | 447 | 503 | 176 |

Notes:
c = comparative
r = remaining (active)
AO1, P1, P2 = as per table

TABLE 2.2

| | Film Properties | | | |
|---|---|---|---|---|
| | Experiment | | | |
| | 10-c | 20-c | 30-c | 40 |
| Dart Impact (grams/mil) | 175 | 227 | 368 | 366 |
| Puncture (grams/mil) | 81 | 113 | 79 | 82 |
| MD Tear (grams/mil) | 343 | 335 | 342 | 356 |
| TD Tear (grams/mil) | 536 | 565 | 483 | 493 |
| Elongation (%) | 364 | 377 | 369 | 354 |

What is claimed is:

1. A process for stabilizing a thermoplastic polyolefin during melt processing conditions said process comprising the step of incorporating into said thermoplastic polyolefin a stabilizer package comprising:

(i) at least one aryl monophosphite; and
　(ii) at least one diphosphite, and subjecting said thermoplastic polyolefin to sufficient temperature to melt said polyolefin; with the proviso that said stabilizer package is essentially free of any additive selected from the group consisting of hindered phenolic antioxidants, lactone stabilizers and hydroxylamine stabilizers; wherein said thermoplastic polyolefin is a linear polyethylene which contains from 0.5 to 10 ppm of at least one transition metal selected from the group consisting of titanium, vanadium, zirconium and chromium.

2. The process according to claim 1 wherein said linear polyethylene is a copolymer of ethylene and at least one olefin selected from the group consisting of butene, pentene, hexene and octene.

3. The process according to claim 2 wherein said linear polyethylene has a density of from 0.880 to 0.960 g/cc and a melt index, $I_2$, as determined by ASTM D1238 of from 0.3 to 150 g/10 minutes.

4. The process according to claim 3 wherein said melting processing conditions comprise a film extrusion at a temperature of from 200° C. to 320° C.

* * * * *